United States Patent [19]

Keyworth et al.

[11] 4,097,451

[45] Jun. 27, 1978

[54] FLAME-RETARDANT RESINOUS COMPOSITIONS

[75] Inventors: Donald A. Keyworth, Houston, Tex.; Eugene P. Di Bella, Piscataway; Marvin Rosen, Warren, both of N.J.

[73] Assignee: Tenneco Chemicals, Inc., Saddle Brook, N.J.

[21] Appl. No.: 463,566

[22] Filed: Apr. 24, 1974

Related U.S. Application Data

[63] Continuation-in-part of Ser. No. 423,565, Dec. 10, 1973, abandoned.

[51] Int. Cl.² .............................................. C08K 5/02
[52] U.S. Cl. .......................... 260/45.7 R; 106/15 FP; 260/45.75 B; 260/DIG. 24
[58] Field of Search ............... 260/2.5 AJ, 2.5 FP, 260/45.7 R, 45.7 RL; 106/15 FP

[56] References Cited

U.S. PATENT DOCUMENTS

| | | | |
|---|---|---|---|
| 2,267,712 | 12/1941 | Bauer | 260/654 |
| 2,676,927 | 4/1954 | McCurdy et al. | 260/2.5 |
| 2,760,947 | 8/1956 | Werkema et al. | 260/33.8 |
| 3,392,136 | 7/1968 | Hindersinn et al. | 260/31.8 |
| 3,519,597 | 7/1970 | Weil et al. | 260/45.75 |
| 3,652,690 | 3/1972 | Ito et al. | 260/652 |
| 3,655,589 | 4/1972 | Wingler et al. | 260/2.5 |
| 3,666,692 | 5/1972 | Paige et al. | 260/2.5 |
| 3,677,942 | 7/1972 | Feiner et al. | 252/8.1 |
| 3,819,547 | 6/1974 | Pillar et al. | 260/2.5 |

OTHER PUBLICATIONS

Lespieau et al., Chem. Abs., vol. 19, 1925, 2472.

*Primary Examiner*—Donald E. Czaja
*Assistant Examiner*—R. A. White
*Attorney, Agent, or Firm*—Evelyn Berlow

[57] ABSTRACT

1,1,2,3,4,4-Hexabromobutene 2 is used to impart flame-retardance to polyolefins and other thermoplastic organic polymers that are normally susceptible to burning.

8 Claims, No Drawings

FLAME-RETARDANT RESINOUS COMPOSITIONS

This is a continuation-in-part of our copending application Ser. No. 423,565, which was filed on Dec. 10, 1973 and which has been abandoned.

The invention relates to flame-retardant resinous compositions. More particularly, it relates to thermoplastic organic polymer compositions that contain a flame-retarding amount of 1,1,2,3,4,4-hexabromobutene-2.

Organic polymers are widely used in the preparation of a broad range of consumer and industrial articles. As normally prepared, these polymers are readily ignitable and flammable. Because of the fire hazard inherent in their use, it is necessary that compositions containing organic polymers be rendered flame-retardant. A number of halogenated organic compounds have been suggested as flame-retardants for organic polymers, but none has proven to be entirely satisfactory in this application. While many of the halogenated compounds are effective in improving the flame-retardance of the polymers, they usually have an adverse effect on the properties of the polymers when they are used in amounts sufficient to impart the desired degree of flame-retardance. In addition, many of the halogenated compounds are volatile or unstable, and polymer compositions containing them lose their flame resistance with the passage of time. A number of brominated compounds have been found to be unsatisfactory because they have a plasticizing effect on the polymer compositions which is undesirable in rigid plastic systems.

In accordance with this invention, it has been found that 1,1,2,3,4,4-hexabromobutene-2 is a very effective flame-retardant agent for thermoplastic organic polymer compositions.

1,1,2,3,4,4-Hexabromobutene-2, which has the structural formula

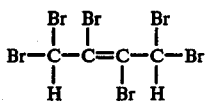

has a combination of properties that makes it particularly valuable as a flame-retardant for resinous compositions. It is a crystalline compound that melts at about 180° C. and that contains 90 percent by weight of bromine. Because of its solid form, it is very well suited for use at relatively high levels in organic polymer compositions in which the plasticizer activity frequently contributed by liquid brominated organic compounds is undesirable because it has a deleterious effect on the physical and mechanical properties of the products. Because it is non-volatile, stable, and insoluble in water and most common organic solvents, hexabromobutene-2 cannot be separated from the polymer compositions by leaching, washing, or evaporation. In addition, hexabromobutene-2 is non-toxic, non-irritating, and biodegradable.

1,1,2,3,4,4-Hexabromobutene-2 is commercially available as a mixture that contains about 85 to 95 percent of the trans isomer and 5 to 15 percent of the cis isomer. The trans isomer is insoluble in water and in most organic solvents; the cis isomer is moderately soluble in acetone and certain other organic solvents. While the cis and trans isomers can be separated and used individually as the flame-retardant in the compositions of this invention, it is preferred for reasons of economy and performance that a mixture of isomers that contains about 90 percent of the trans isomer and 10 percent of the cis isomer is used.

1,1,2,3,4,4-Hexabromobutene-2 can be prepared easily and in good yield by the bromination of diacetylene. This reaction can be conveniently and safely carried out by contacting a gas stream that contains about 20 to 40 mole percent of diacetylene in an inert gas, such as nitrogen, with a dilute solution of bromine in water, carbon tetrachloride, or another inert solvent. The product of this reaction is a mixture of polybrominated compounds that contains about 75 to 80 percent by weight of 1,1,2,3,4,4-hexabromobutene-2, 15 to 23 percent by weight of 1,1,2,4-tetrabromobutene-2, and small amounts of dibromobutadienes. The crystalline hexabromobutene-2 may be separated from the product mixture by filtration. Hexabromobutene-2 prepared in this way contains 85 to 95 percent of the trans isomer and 5 to 15 percent of the cis isomer, and usually about 90 percent of the trans isomer and 10 percent of the cis isomer. This isomer mixture can be used without further treatment as the flame-retardant in organic polymer compositions.

1,1,2,3,4,4-Hexabromobutene-2 can be used to impart flame-retardance to a wide variety of normally-flammable thermoplastic organic polymers. While it is particularly suitable for use in compositions that are processed at temperatures below 200° C., it can also be used in compositions that are processed at higher temperatures for relatively short periods of time. Illustrative of the organic polymers that can be used in the novel compositions are polyolefins including homopolymers and copolymers of ethylene, propylene, and isobutylene; vinyl chloride homopolymers and vinyl chloride copolymers with, for example, vinyl acetate or acrylonitrile; vinyl acetate homopolymers and vinyl acetate copolymers with, for example, acrylonitrile or vinylidene chloride; polyamides, polyoxymethylenes; acrylic homopolymers and copolymers prepared from such monomers as acrylic acid, methacrylic acid, the esters of these acids with alkanols having 1 to 4 carbon atoms, and acrylonitrile; and mixtures thereof. Hexabromobutene-2 is particularly effective as the flame-retardant in compositions that contain polyolefins, polyvinyl chloride, or acrylic resins.

Hexabromobutene-2 can be incorporated in the polymer compositions by any convenient procedure. For example, it can be mixed with the polymer in a mill or extruder, or it can be applied to the surface of a shaped resinous article. Alternatively, it can be used to coat particles of the polymer prior to molding, or it can be added to the monomer composition before it is polymerized. It is generally preferred that finely-ground hexabromobutene-2 be added to the polymer and other components of the composition prior to the final molding step.

The amount of 1,1,2,3,4,4-hexabromobutene-2 that is incorporated into the polymer compositions is that which will impart the desired degree of flame retardance to the compositions without adversely affecting their physical properties. The addition of as little as 5 percent of hexabromobutene-2, based on the weight of the composition, results in a significantly reduced burn rate. Because it does not function as a plasticizer, 50 percent or more of hexabromobutene-2, based on the weight of the composition, can be used to achieve maximum flame retardance without harming the properties of the compositions. It is generally preferred that 10 percent to 25 percent of hexabromobutene-2, based on the weight of the polymer, be used in both rigid and flexible organic polymer compositions.

In addition to the organic polymer and hexabromobutene-2, the compositions of this invention may contain a synergist such as antimony oxide, fillers, pigments, dyes, stabilizers, lubricants, plasticizers, and other additives in the amounts ordinarily used for these purposes.

The invention is further illustrated by the following examples.

EXAMPLE 1

1,1,2,3,4,4-Hexabromobutene-2 was evaluated as a flame retardant in polyolefin compositions by the following procedure:

The appropriate amount of finely-divided hexabromobutene-2 was mixed with 100 parts by weight of a commercial polyolefin resin. The resulting mixtures were extruded into 0.125 inch rigid wire using a mixing extruder. The wires were cut into 6 inch lengths, and these specimens were tested for flammability by determining their Limiting Oxygen Index values according to the procedure described in ASTM D-2863. Specimens extruded from the same resins without a flame-retardant additive served as controls. The polymers used, the amounts of flame-retardant added, the extrusion temperatures employed, and the results obtained are summarized in the following table.

| Polymer | Extrusion Temperature (° C.) | Level of Hexabromo-butene-2 (PHR) | Limiting Oxygen Index |
| --- | --- | --- | --- |
| Polyethylene - low density (DuPont Alathon 34) | 130–135 | 25 | 21.6 |
| " | 130–135 | 10 | 20.8 |
| " | 130–135 | 0 | 17.3 |
| Polyethylene - high density (Phillips Marlex 6009) | 150–155 | 25 | 21.8 |
| " | 150–155 | 10 | 19.3 |
| " | 150–155 | 0 | 17.5 |
| Polypropylene (Hercules Profax 6523) | 170–175 | 25 | 21.7 |
| " | 170–175 | 10 | 21.1 |
| " | 170–175 | 0 | 19.2 |

EXAMPLE 2

1,1,2,3,4,4-Hexabromobutene-2 was evaluated as a flame-retardant in a flexible clear polyvinyl chloride composition by the following procedure:

The following materials were mixed together:

| | Parts by Weight |
| --- | --- |
| Polyvinyl chloride (relative viscosity 2.4 (1% in cyclohexane)) | 100.0 |
| Ba/Cd/Zn stabilizer (NUOSTABE V-1397) | 3.0 |
| Stearic acid | 0.5 |
| Epoxidized soybean oil | 5.0 |
| Dioctyl phthalate | 35.0 |
| Hexabromobutene-2 | 10.0 |

The mixture was milled at 330° F. on a two roll mill for 5 minutes and removed from the mill as a sheet 0.045 inch thick. Specimens cut from the sheet were press molded to form a sheet that was 0.07 inch thick.

The Limiting Oxygen Index of this composition as determined by the procedure described in ASTM D-2863 was 24.1.

A control composition that contained 45 parts of dioctyl phthalate and no hexabromobutene-2 had a Limiting Oxygen Index of 22.2.

Flame retardance can be imparted to each of the other organic polymers disclosed herein by incorporating in the polymer composition a flame-retarding amount of 1,1,2,3,4,4-hexabromobutene-2.

What is claimed is:

1. A flame-retardant resinous composition comprising a thermoplastic organic polymer selected from the group consisting of polyolefins and vinyl chloride polymers and a flame-retarding amount of 1,1,2,3,4,4-hexabromobutene-2.

2. A flame-retardant resinous composition as set forth in claim 1 that contains 5 percent to 50 percent, based on the weight of the polymer, of 1,1,2,3,4,4-hexabromobutene-2.

3. A flame-retardant resinous composition as set forth in claim 1 that contains 10 percent to 25 percent, based on the weight of the polymer, of 1,1,2,3,4,4-hexabromobutene-2.

4. A flame-retardant resinous composition as set forth in claim 1 wherein the 1,1,2,3,4,4-hexabromobutene-2 is a mixture of isomers containing about 90 percent of the trans isomer and 10 percent of the cis isomer.

5. A flame-retardant resinous composition as set forth in claim 1 wherein the organic polymer is a polyolefin.

6. A flame-retardant resinous composition as set forth in claim 5 wherein the organic polymer is polyethylene.

7. A flame-retardant resinous composition as set forth in claim 5 wherein the organic polymer is polypropylene.

8. A flame-retardant resinous composition as set forth in claim 1 wherein the organic polymer is polyvinyl chloride.

* * * * *